United States Patent [19]

Boateng

[11] Patent Number: 5,135,652
[45] Date of Patent: Aug. 4, 1992

[54] METHOD FOR THE SOLVENT EXTRACTION OF ZINC

[75] Inventor: Daniel A. D. Boateng, Montrose, Canada

[73] Assignee: Cominco Ltd., Vancouver, Canada

[21] Appl. No.: 603,065

[22] Filed: Oct. 25, 1990

[51] Int. Cl.⁵ .............................................. B01D 11/00
[52] U.S. Cl. ..................... 210/634; 210/638; 210/688; 204/119; 423/106; 75/961
[58] Field of Search ............... 210/634, 684, 638, 688, 210/687; 423/95, 100, 109, 101, 24, 150; 204/119, 114, 108, 66, 117; 75/961, 739

[56] References Cited

U.S. PATENT DOCUMENTS

| | | | |
|---|---|---|---|
| 3,441,372 | 4/1969 | Pegler et al. | |
| 3,966,569 | 6/1976 | Reinhardt et al. | 423/100 |
| 3,989,607 | 11/1976 | Bush et al. | 423/100 |
| 4,053,552 | 11/1977 | Clitheroe et al. | 423/100 |
| 4,125,587 | 11/1978 | Leimala et al. | 423/100 |
| 4,194,905 | 3/1980 | Gallacher | 423/99 |
| 4,500,498 | 2/1985 | Kruesi et al. | 423/100 |
| 4,552,629 | 11/1985 | Duyvesteyn et al. | 423/100 |
| 4,624,704 | 11/1986 | Byeseda | 210/688 |
| 4,721,605 | 1/1988 | Brown et al. | 210/687 |
| 4,778,520 | 10/1988 | Spink et al. | 423/100 |
| 4,891,130 | 1/1990 | Pitts | 423/150 |
| 5,028,403 | 7/1991 | Rickelton et al. | 210/634 |

Primary Examiner—Robert A. Dawson
Assistant Examiner—Ana Fortuna
Attorney, Agent, or Firm—Arne I. Fors

[57] ABSTRACT

Zinc is selectively extracted from zinc sulfate solutions that may also contain sulfuric acid and amounts of other metals with an organic extractant mixture containing both organic substituted phosphoric acid and organic substituted thiophosphinic acid. The phosphoric acids are preferably chosen from mono- and di-2-ethylhexylphosphoric acids and mixtures thereof, and the phosphinic acids are preferably chosen from bis- 2, 4, 4-trimethylpentyl mono- and dithiophosphinic acids. The use of an extractant mixture of the dithiophosphinic acid with mono- and di-2-ethylhexyl phosphoric acids or an extractant mixture of the dithiophosphinic acid with di-2-ethylhexylphosphoric acid is preferred. The pH during zinc extraction is controlled at a value in the range of about 1.3 to 5. Control of pH is carried out either by neutralization or by acid extraction with an organic amine-type extractant. The acid content of the feed solution may be reduced by neutralization or acid removal by dialysis. The solvent extraction of zinc or zinc and acid from feed solution may be carried out co-, counter- or cross-currently in one or more stages. The preferred extraction method is dualcircuit, side-by-side, simultaneous zinc and acid extraction. The use of the mixed extractant for zinc is more effective than extraction with the component extractants by themselves.

27 Claims, 3 Drawing Sheets

METHOD FOR THE SOLVENT EXTRACTION OF ZINC

This invention relates to the solvent extraction of zinc and, more particularly, to a method for the extraction of zinc from sulfate solutions using organic phosphoric and thiophosphinic extractants.

BACKGROUND OF THE INVENTION AND PRIOR ART

A large number of extractants are known that are capable of extracting zinc from solutions that may also contain one or more other metals such as iron, copper, silver, cadmium, cobalt, nickel, manganese, magnesium, calcium, sodium, potassium, arsenic and antimony. Zinc and other metals have been extracted from solutions with organo phosphorus compounds such as substituted organic phosphoric acids, particularly di-2 ethylhexylphosphoric acid (D2EHPA). Methods for the extraction of zinc with D2EHPA are disclosed in references that include Hydrometallurgy 3 (4), 327–342, Oct. 1978; Chem. Engg. Res. and Design 61, 62–66, Jan. 1983; U.S. Pat. Nos. 3 989 607, 3 441 372, 4 124 462, 4 423 012, 4 552 629 and 4 618 428; and CA Patents 1 083 830, 1 098 719 and 1 198 290.

It is also known that zinc and many other metals form complexes with substituted phosphinic acids. Methods that use substituted phosphinic acids for the extraction of zinc from solutions are disclosed, for example, in U.S. Pat. Nos. 3 966 569 and 4 721 605. According to the former, zinc and iron are removed with a dialkylphosphinic acid in a multiple-stage solvent extraction process using different extractants. According to the latter, a metal from a first group consisting of zinc, silver, cadmium, mercury, nickel, cobalt and copper can be extracted from solution additionally containing a metal from a second group consisting of calcium and magnesium by contacting an aqueous solution containing one or more of the metals of the first group with an organic-soluble substituted dithiophosphinic acid or salt thereof at a pH of from 0.2 to 3.0. It is apparent from the disclosure of this patent that, when more than one metal of the first-recited group is present in the solution, all of these metals are extracted. The extraction is only selective with respect to the metals of the second-recited group.

None of these references disclose the selective extraction of zinc from a zinc sulfate solution with an extractant mixture that contains both an organic substituted phosphoric acid and an organic substituted thiophosphinic acid.

SUMMARY OF THE INVENTION

I have now discovered that zinc may be selectively extracted from a zinc sulfate solution, containing zinc sulfate, sulfuric acid, as well as controlled amounts of other metals, with an extractant mixture that contains an effective amount of both an organic substituted phosphoric acid, such as an alkylphosphoric acid, and an effective amount of an organic substituted thiophosphinic acid.

More specifically, aqueous zinc sulfate-containing solution that may also contain sulfuric acid and controlled concentrations of other metals is mixed in an extraction step with an extractant mixture for the substantially selective extraction of zinc from the other metals in the solution with the formation of an extract phase and a raffinate phase. After settling, the extract is separated from the raffinate, and zinc salt solution substantially free of other metals is stripped from the extract by contacting the extract in a stripping step with a suitable stripping solution. The raffinate is removed from the process, the purified zinc salt solution stripped from the extract is treated for the recovery of zinc, and the stripped extractant is returned to the extraction step.

The acid content of solutions in the solvent extraction must be controlled which can be done by the addition of a neutralizing agent or by solvent extraction of the acid.

Using solvent extraction, a multi-step process of dual-circuit, alternating zinc and acid extraction steps may be used. According to a preferred embodiment, the method of the invention is carried out in a dual-circuit, side-by-side simultaneous extraction of zinc and sulfuric acid. In the acid extraction circuit, acid is extracted from the aqueous feed solution and from the raffinate from the zinc extraction circuit with an extractant suitable for extracting sulfuric acid for the formation of an acid extract and an acid extraction raffinate. The acid extract is stripped of its sulfuric acid content, and the stripped organic phase is returned to the extraction step. The acid extraction raffinate is recirculated to the zinc extraction where zinc is extracted with a suitable organic extractant for zinc and with the formation of a zinc extract and a zinc extraction raffinate. The zinc extraction raffinate is recirculated to the acid extraction, and a portion of the recirculating raffinate is removed from the process as a residual solution substantially free of zinc. The zinc extract is stripped for the removal of zinc. Removed zinc is recovered as a zinc salt solution such as zinc sulfate or zinc chloride solution. Each of the steps of zinc extraction, zinc stripping, acid extraction and acid stripping may be carried out in one or more stages.

The extractant mixture for zinc consists of a mixture of an effective amount of one or more organic substituted phosphoric acids and an effective amount of an organic substituted thiophosphinic acid in an appropriate ratio and, preferably, in admixture with a suitable diluent. The substituted phosphoric acids are preferably ethylhexylphosphoric acids chosen from the group consisting of mono-2-ethylhexylphosphoric acid (M2EHPA), di-2-ethylhexylphosphoric acid (D2EHPA) and mixtures thereof. The substituted thiophosphinic acids are preferably chosen from the group consisting of bis- 2, 4, 4-trimethylpentylmonothiophosphinic acid (Cyanex$_{TM}$302) and bis- 2, 4, 4 -trimethylpentyldithiophosphinic acid (Cyanex$_{TM}$301). The use of an extractant mixture of D2EHPA and Cyanex$_{TM}$302, or a mixture of M2EHPA, D2EHPA and Cyanex$_{TM}$302 is preferred. By using a mixture of the phosphoric and thiophosphinic extractants, the extraction of zinc is enhanced, and is greater than can be obtained with either the phosphoric acids or the thiophosphinic acids alone. The pH during zinc extraction is controlled at a value in the range of about 1.3 to 5.

Accordingly, there is provided a method for the selective extraction of zinc from an acidic aqueous solution containing zinc sulfate and essentially free of ferric iron and co-extractable metals including the steps of contacting said solution with an extractant mixture containing an effective amount of at least one organic substituted phosphoric acid, and an effective amount of an organic substituted thiophosphinic acid for the formation of a zinc extract containing said zinc and of a zinc extraction raffinate; controlling the acid content during said extraction of zinc such that the pH in said extraction is in the range of about 1.3 to 5; separating said extract from said raffinate; contacting separated extract in a zinc stripping with a suitable aqueous stripping solution for removing said zinc from said extract into said stripping solution; and recovering said zinc as a zinc salt solution.

Accordingly, there is further provided a method for the selective extraction of zinc from an acidic aqueous solution containing zinc sulfate including the steps of contacting said solution with an extractant mixture containing an extractant for zinc chosen from the group consisting of mono-2-ethylhexylphosphoric acid, di-2-ethylhexylphosphoric acid, a mixture of mono-2-ethylhexylphosphoric acid and di-2-ethylhexylphosphoric acid, and an extractant for zinc chosen from the group consisting of bis- 2, 4, 4 -trimethylpentylmonothiophosphinic acid and bis- 2, 4, 4 -trimethylpentyldithiophosphinic acid for the formation of a zinc extract containing said zinc and of a zinc extraction raffinate; controlling the acid content during said extraction of zinc such that the pH in said extraction is in the range of about 1.3 to 5; separating said extract from said raffinate; contacting separated extract in a zinc stripping with a suitable aqueous stripping solution for removing said zinc from said extract into said stripping solution; and recovering said zinc as a zinc salt solution.

Preferably, said extractant mixture contains mono-2-ethylhexylphosphoric acid, di-2- ethylhexyl phosphoric acid and bis- 2, 4, 4 -trimethylpentylmonothiophosphinic acid. Preferably, said extractant mixture contains di-2- ethylhexylphosphoric acid and bis-2-, 4, 4-trimethylpentylmonothiophosphinic acid.

It is an aspect of the present invention to extract zinc selectively from zinc sulfate-containing solutions. It is another aspect to selectively extract zinc from zinc sulfate solutions with an extractant mixture containing organic substituted phosphoric acid and organic substituted thiophosphinic acid. It is a further aspect to selectively extract zinc and sulfuric acid from acidic zinc sulfate solutions using dual-circuit, side-by-side simultaneous extraction of zinc and acid. It is yet another aspect to selectively extract zinc and sulfuric acid from acidic zinc sulfate solutions using dual-circuit, alternating extraction of zinc and acid. These and other aspects will become apparent from the following detailed description of preferred embodiments of the invention.

DETAILED DESCRIPTION

Figure 1:
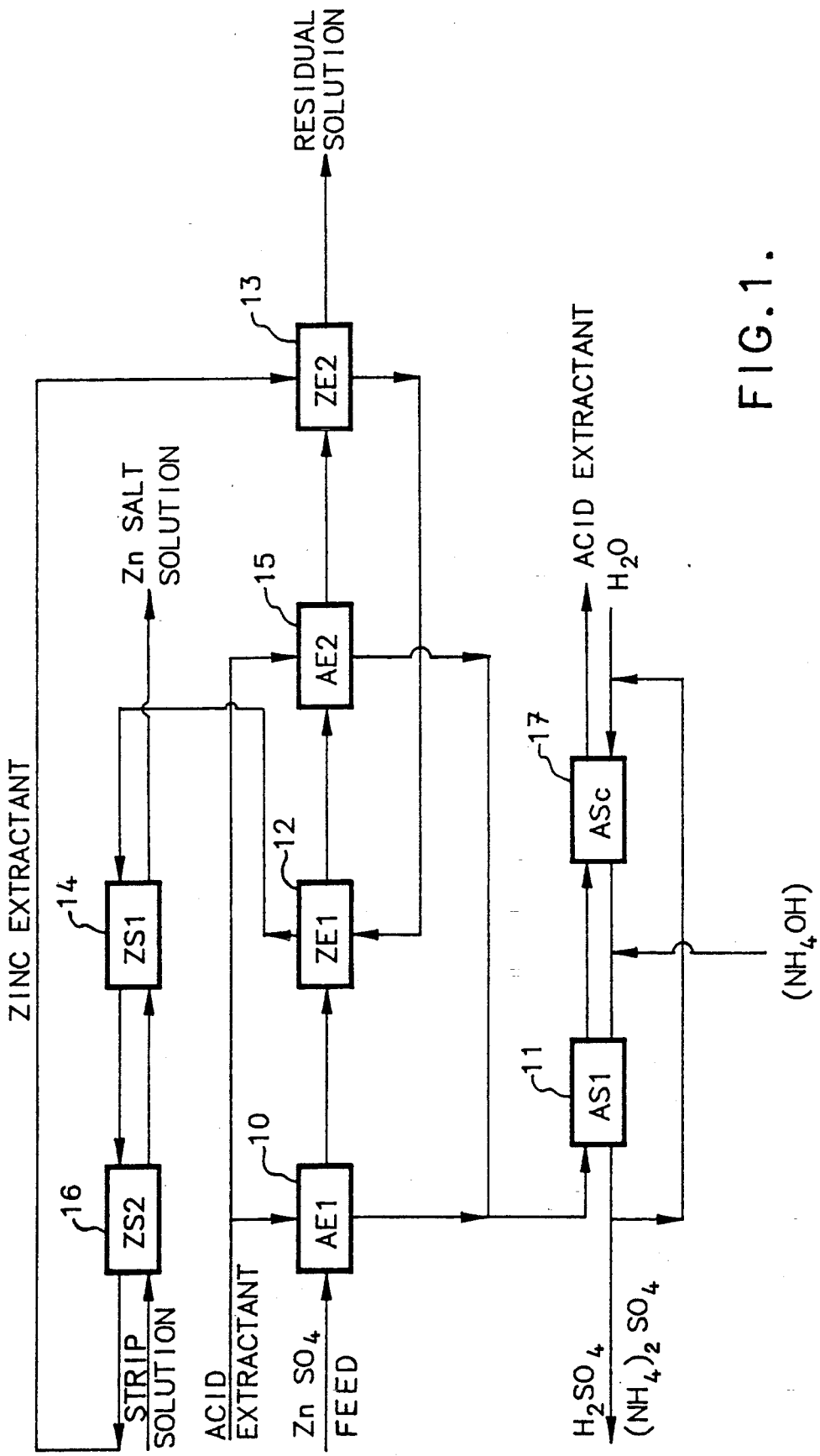
FIG. 1 depicts a schematic flow scheme of a dual-circuit alternating extraction of zinc and acid.

Solutions that may be treated according to the method of the present invention are zinc sulfate - containing solutions which may contain $ZnSO_4$ up to its saturation concentration and up to about 150 g/L $H_2SO_4$. Practically, feed solutions may contain from about 1 to 300 g/L $ZnSO_4$ and from about 10 to 150 g/L $H_2SO_4$. The feed solutions should be substantially free of ferric iron. In addition, the feed solutions may also contain at least one metal chosen from the group consisting of ferrous iron, calcium, magnesium, manganese, sodium, potassium, arsenic and antimony. The feed solution should be essentially free of co-extractable metals such as copper, cadmium, germanium and indium. The co-extractable metals must be present in concentrations below the values at which they would be co-extracted. The concentrations must, therefore, each be considerably less than the concentration of zinc in the feed solutions. For example, a solution containing 1 g/L zinc should not contain more than about 0.1 g/L of each of co-extractable metals. If feed solutions contain higher concentrations of co-extractable metals, the concentrations should be reduced prior to selective extraction of the zinc using methods known in the art. Any ferric iron in the feed solutions should be removed or reduced to the ferrous state by usual means prior to extraction. Amounts of metals other than those mentioned above may be present in the feed solution in incidental or trace amounts.

The method of the invention is carried out in a conventional manner using known equipment. The zinc sulfate solution is treated by liquid-liquid extraction including extraction, stripping and scrubbing steps using either mixer-settlers or extraction columns, both with the appropriate use of agitation. Means are also provided to maintain the amount of acid in the solvent extraction of zinc at a controlled level, as will be described.

The extractant mixture used in the extraction of zinc consists of a mixture of an effective amount of at least one organic substituted phosphoric acid and an effective amount of an organic substituted thiophosphinic acid dissolved in an appropriate amount of a suitable diluent. The phosphoric acids are, preferably, chosen from the group consisting of mono-2-ethylhexylphosphoric acid (M2EHPA), di-2-ethylhexylphosphoric acid (D2EHPA) and mixtures thereof (EHPA). The thiophosphinic acids are, preferably, chosen from the group consisting of dialkylthiophosphinic acids such as bis-2,4,4-trimethylpentylmonothiophosphinic acid, sold under the name of Cyanex $_{TM}$302 or bis-2,4,4-trimethylpentyldithiophosphinic acid, sold under the name Cyanex $_{TM}$301. It is understood that other dithiophosphinic acids such as those mentioned in U.S. Pat. No. 4 721 605, and that can be selective for the extraction of zinc, may also be used. The ratio of phosphoric acid to phosphinic acid in the extractant mixture is in the range of about 1:1 to 6:1 by volume, and is preferably in the range of about 1:1 to 3:1 by volume. The phosphoric and phosphinic extractants are dissolved in a suitable water-immiscible organic diluent such as, for example, Exxsol $_{TM}$D80 in a volume ratio in the range of about 1:1 to 1:9 extractants to diluent. The most preferred extractant mixture contains D2EHPA or M2EHPA+D2EHPA and Cyanex $_{TM}$302, diluent in amounts of about 5 to 30% by volume of D2EHPA or M2EHPA+D2EHPA and about 5 to 20% by volume of Cyanex 302, the balance being substantially diluent, for example, Exxsol $_{TM}$D80.

The extractant mixture is contacted with the aqueous acidic zinc sulfate-containing solution in an organic to aqueous volume phase ratio (o/a ratio) selected on the basis of the zinc concentration in the aqueous phase. The contacting is carried out for the formation of an extract, i.e. loaded organic phase, and a raffinate, i.e. aqueous phase, with appropriate Zn concentrations. If desired, a small amount of a modifier such as, for example, an alcohol with a long hydrocarbon chain (e.g. decanol) may be used to facilitate the separation, enhance the extraction or both. The zinc sulfate is selectively extracted into the extract while the other metals as defined hereinabove substantially remain in the raffinate. The extraction may be carried out at temperatures in the range of about 0° C. to 60° C. and, preferably, at ambient temperatures such as in the range of about 20° C. to 50° C.

In the extraction of zinc from zinc sulfate, an amount of sulfuric acid is formed that is equivalent to the amount of sulfate in the zinc sulfate. It is necessary that this amount and any amount of free sulfuric acid present in the zinc sulfate solution be controlled. The acid content can be controlled by any one of a number of methods either alone or in combination.

Generally, the pH during zinc extraction is controlled at a value in the range of about 1.3 to 5. Below a pH of about 1.3, the extraction efficiency is low, while at a pH above about 5, basic zinc sulfate or zinc hydroxide may precipitate. When additional metals are present, the pH is preferably in the range of about 1.7 to 3.

Control may be exercised by either removal, neutralization, extraction or a combination of these methods of at least a portion of the acid prior to or during the solvent extraction of zinc. Removal may be carried out by such methods as dialysis and electrodialysis. Neutralization may be carried out prior to or during the extraction of zinc by adding a suitable alkaline neutralizing agent such as potassium hydroxide, sodium hydroxide or ammonium hydroxide solution. As the increase in aqueous acid concentration due to the generation of acid in the zinc extraction step limits the zinc extraction, the acid content in the zinc extraction is controlled by neutralization of at least a portion of the acid with an alkaline solution such as, preferably, sodium hydroxide or ammonium hydroxide solution. Alternatively, by only extracting a small amount of zinc from a neutral solution, the generation of a limited (equivalent) amount of acid is achieved. This small amount of zinc is in the range of about 3 to 5 g/L. Of course, extraction of zinc may be carried out with simultaneous neutralization of a portion of the acid such that the free acid content of the raffinate does not exceed an amount of free acid in the range of about 5 to 8 g/L.

Extraction of acid is carried out with a suitable organic extractant, as will be explained. Because of the need for extracting only a limited amount of zinc in the absence of simultaneous neutralization, many extraction steps may be required, the number being dependent on the concentration of zinc in the feed solution.

The extraction of zinc, or zinc and acid, is carried out in mixer-settlers with agitation and in co-current, counter-current or cross-current fashion. Continuous counter-current zinc extraction and cross-current acid extraction are preferred. Aqueous feed solution is mixed with extractant in the mixer-settler and the two-phase liquid mixture is settled with the formation of an extract and a raffinate.

Suitable extractants for sulfuric acid are amine-type extractants which include primary, secondary, tertiary and quaternary amines, such as, for example, Alamine $_{TM}$336 (tricaprylamine) or Primene $_{TM}$JMT (C16-C22 tert alkyl primary amine). The acid extractant is mixed with a suitable diluent to give an amine concentration of about 4 to 25% by volume. If desired, a modifier may be added at a concentration of, for example, about 1 to 8% by volume.

In one embodiment, the extraction of zinc and the extraction of sulfuric acid are carried out in a series of alternating extraction steps wherein zinc sulfate-containing solution is contacted with an extractant for zinc in a zinc extraction step and acid is extracted from the raffinate from the zinc extraction in an acid extraction step.

The zinc extract is contacted with an acidic solution to strip the zinc into a zinc salt solution. A solution containing sulfuric acid may be used for stripping to give a strip liquor containing zinc sulfate. Alternatively, a hydrochloric acid solution may be used to give a zinc chloride strip liquor. In a zinc production plant using electrolysis, the spent acid solution from the cell house may be conveniently used for zinc stripping. The acid extract may be stripped with water to give sulfuric acid, but preferably the extract is stripped with an alkali solution to give a sulfate. An ammonium hydroxide solution is used to strip the acid producing an ammonium sulfate solution.

With reference now to the schematic of FIG. 1 for dual-circuit, alternating zinc and acid extractions, aqueous acidic zinc sulfate solution is fed to a first acid extraction 10, wherein solution is mixed with a suitable extractant for sulfuric acid. After phase separation, the extract is passed to an acid stripping 11, and the raffinate is passed to a first zinc extraction 12. In first zinc extraction 12, raffinate from first acid extraction 10 is mixed with zinc extract from a second zinc extraction 13. After phase separation, the extract is passed to a first zinc stripping 14, and the raffinate is passed to a second acid extraction 15. In second acid extraction 15, the raffinate from first zinc extraction 12 is mixed with more of the acid extractant, and, after phase separation, the extract is passed to the acid stripping 11 while the raffinate is passed to a second zinc extraction 13. The raffinate from second acid extraction 15 is mixed in second zinc extraction 13 with recycled zinc extractant from a second zinc stripping 16. After phase separation, the raffinate is removed from second zinc extraction 13 as residual solution substantially depleted in both zinc and acid, and the extract is fed to first zinc extraction 12.

The zinc is stripped countercurrently from the extract from first zinc extraction 12 in a first and a second zinc stripping 14 and 16, respectively, with a suitable stripping solution and a solution containing the stripped zinc is recovered as a zinc salt solution. Although a number of stripping solutions may be used, the use of sulfuric acid is preferred, resulting in the recovery of a zinc sulfate solution. Alternatively, hydrochloric acid may be used as a stripping solution for the recovery of a zinc chloride solution.

The acid is stripped in the first acid stripping 11 with water for the recovery of sulfuric acid or, preferably, with ammonium hydroxide for the recovery of sulfate as ammonium sulfate, as shown. The acid extractant is scrubbed with water in an acid scrubbing 17. The scrubbed acid extractant is recycled to acid extractions 10 and 15. The scrubbing liquor from scrubbing 17 is passed with or without added ammonium hydroxide to acid stripping 11. When ammonium hydroxide is used, a portion of the recovered ammonium sulfate solution may be recycled as scrubbing solution to acid scrubbing 17. It is understood that, although FIG. 1 depicts a two-stage acid and two-stage zinc extraction process, the process may include as many extraction and stripping stages as necessary to substantially remove acid and zinc from the feed solution.

Figure 2:
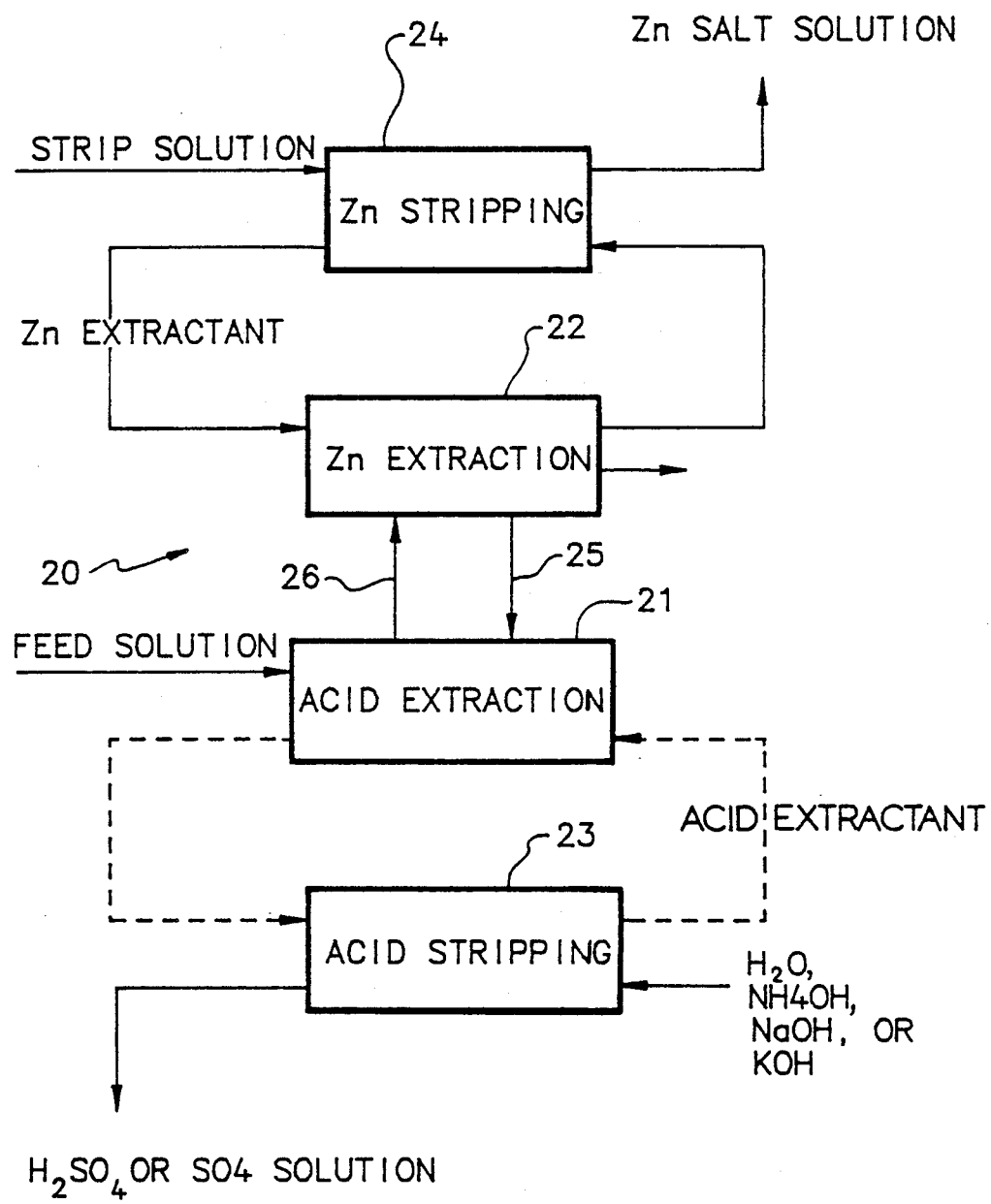
FIG. 2 is a schematic flowsheet of a dual-circuit, side-by-side, simultaneous solvent extraction of zinc and sulfuric acid.

According to a preferred embodiment, aqueous acidic zinc sulfate solutions are subjected to a dual-circuit, side-by-side simultaneous solvent extraction as shown in FIG. 2 and generally indicated with 20. Dual-circuit side-by-side extraction 20 is preferred especially when the concentration of zinc in the feed solution exceeds about 5 g/L. Aqueous acidic zinc sulfate solution is fed as feed solution to acid extraction 21. The concentration of acid in solution fed to solvent extraction 20 should preferably be as low as possible in order to reduce the need for acid removal during solvent extraction. A portion of the acid may be removed prior to feeding solution to extraction 20, as described. In the acid extraction 21 of the acid extraction circuit, acid is extracted from the raffinate 25 from zinc extraction 22 combined with feed solution by mixing the combined aqueous solution with an amine organic extractant, described hereinabove, for extracting sulfuric acid with the formation of an acid extract and an acid extraction raffinate 26. The acid extract, i.e. the acid-loaded organic phase, is passed to acid stripping 23, and the acid extraction raffinate 26 is passed to zinc extraction 22 of the zinc extraction circuit.

In acid stripping 23, the sulfuric acid is stripped from the acid extract, and stripped organic phase (acid extractant) is returned to acid extraction 21. The sulfuric acid is stripped with a compound chosen from water and suitable alkaline substances. Stripping with water makes it possible to recover sulfuric acid directly, while stripping with an alkaline substance forms a sulfate salt. Stripping with alkali is more efficient than stripping with water, and is preferred. One of a number of alkaline substances such as alkali metal or ammonium hydroxide solutions may be used, but the use of ammonium hydroxide is preferred because a saleable byproduct, i.e. ammonium sulfate, is obtained. The formed sulfuric acid or sulfate, preferably ammonium sulfate, is recovered. Both acid extraction 21 and acid stripping 23 are carried out at ambient conditions.

The acid extraction raffinate 26 from acid extraction 21 is passed to zinc extraction 22, where zinc is selectively extracted from the solution with a mixed extractant, described hereinabove. The organic phase is mixed with acid extraction raffinate 26 from acid extraction 21. The mixing is carried out for a time sufficient to extract the zinc from acid extraction raffinate 26 into the organic phase, i.e. the zinc extract, and with the formation of zinc extraction raffinate 25. The pH in zinc extraction 22 is maintained in the range of about 1.3 to 5.0, and preferably in the range of about 1.7 to 3.0. Zinc extraction raffinate 25 from zinc extraction 22, which also contains the acid generated during zinc extraction, is passed to acid extraction 21. The recirculation of the raffinates 25 and 26 between the two extractions 21 and 22 results in substantially complete extraction of the zinc. A residual solution substantially free of acid and zinc but containing substantially all other metals that were contained in the feed solution to the process is removed from the process. The residual solution may be passed to further treatment for the removal of environmentally harmful substances before being discarded.

The zinc extract from zinc extraction 22 is passed to zinc striping 24 for the removal of zinc from the zinc extract and for the recovery of a zinc salt solution and a stripped organic phase. The o/a ratio is selected to give substantially complete stripping of the zinc and yield a desired concentration of zinc salt in the strip solution. The strength of the acid used in zinc stripping 24 is dependent on the zinc concentration desired in the zinc salt solution recovered from zinc stripping 24. Removal of traces of organic extractants in the recovered zinc salt solution may be desirable, and removal may be done by a treatment with activated carbon.

The stripped organic phase is recycled from zinc stripping 24 to zinc extraction 22. Fresh organic phase may be added to make up for any losses that may have occurred.

The simultaneous, side-by-side, dual-circuit countercurrent method is much more efficient than the alternating zinc and acid extraction as described with reference to FIG. 1. In the dual-circuit process, sulfuric acid and zinc are each separated by a suitable extractant, and zinc extraction raffinate 25 from each zinc extraction circuit is exchanged with acid extraction raffinate 26 from a corresponding acid extraction circuit.

Although FIG. 2 illustrates the dual-circuit side-by-side extraction method for one stage each of the zinc and acid extraction and stripping steps, it is understood that each of these steps may be carried out in one or more stages.

Figure 3:
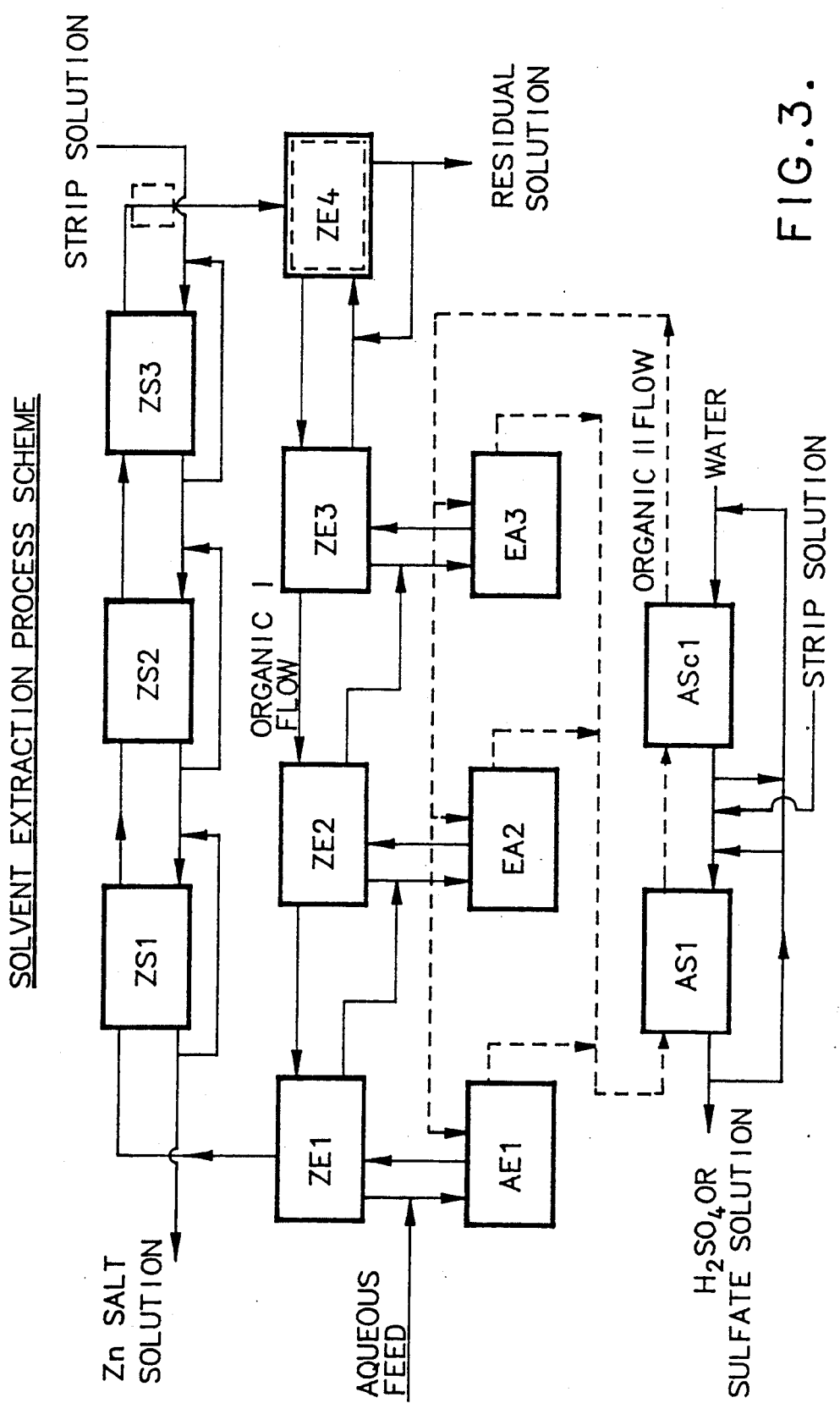
FIG. 3 is a schematic flowsheet of a multi-stage method of the dual-circuit method of FIG. 2.

FIG. 3 illustrates the dual-circuit side-by-side simultaneous extraction method for multiple extraction stages for zinc and for acid. The four zinc extraction stages are indicated with ZE 1, ZE 2, ZE 3 and ZE 4, the latter being optional and without a corresponding acid extraction stage. The three acid extraction stages are indicated with AE 1, AE 2 and AE 3. The zinc circuit also includes three zinc stripping stages indicated with ZS 1, ZS 2 and ZS 3. The acid circuit also includes an acid stripping stage marked AS 1 and an acid scrubbing stage marked ASc 1. In the zinc circuit the flows of aqueous and organic phases are essentially counter-current as are the flows of raffinates between the acid extraction stages and the zinc extraction stages. These flows of liquids are similar to those described with reference to FIG. 2. The scrubbing of the stripped acid extractant in scrubbing ASc 1 is carried out with water, while the stripping of acid in AS 1 is carried out with the scrubbing liquid from scrubbing ASc 1 to which a second strip solution may be added. The second strip solution is water or an alkaline solution such as sodium hydroxide solution or ammonium hydroxide solution, the latter being preferred. The use of water enables the recovery of the stripped acid as a sulfuric acid solution, while the use of ammonium or sodium hydroxide enables the recovery of a sodium or ammonium sulfate solution. Aqueous phase recycle is included in the zinc extraction and stripping steps and in the acid stripping and scrubbing steps to maintain a volumetric phase ratio of about unity, as is a common practice to obtain optimum contacting.

The use of an extractant mixture that contains both an organic substituted phosphoric acid and an organic substituted thiophosphinic acid has a number of important advantages over using either one of the zinc extractants alone. Zinc extraction is improved and a recovery of 99% or better of the zinc from feed solution may be achieved. The zinc extraction has good selectivity, and phase separations are better.

The invention will now be illustrated with the following non-limitative examples. In the examples, the following abbreviations are used:

D2EHPA = di-2-ethylhexylphosphoric acid
EHPA = a mixture of di-2-ethylhexylphosphoric acid and mono-2-ethylhexylphosphoric acid
CNX 302 = Cyanex$_{TM}$ 302.

All extractants and extractant mixtures were dissolved in Exxso$_{TM}$ D80 diluent.

EXAMPLE 1

This example illustrates phase disengagement characteristics of various extractant solutions during contacting with acidic sulfate solutions. A 280 mL portion of organic solution was agitated for two minutes with a 140 mL portion of two aqueous solutions (a) and (b) containing 225 g/L $H_2SO_4$, and 35 g/L $H_2SO_4$, 47 g/L Zn, 7.5 g/L Mg and 1.2 g/L Mn, respectively, and left to separate. The results are given in Table I.

TABLE I

| | Separation Time (seconds) | |
|---|---|---|
| Extractant | (a) 225 g/l $H_2SO_4$ | (b) Acidic sol'n containing Zn, Mg & Mn |
| 30% D2EHPA | 75 | 120 |
| 30% EHPA | 130 | 210 |
| 30% CNX 302 | 60 | 70 |
| 15% D2EHPA, 15% CNX 302 | 65 | 90 |
| 15% EHPA, 15% CNX 302 | 180 | 330 |

The CNX 302 solution had the fastest phase separation, followed by the mixed CNX 302 and D2EHPA solution. The latter gave faster separation than D2EHPA by itself.

EXAMPLE 2

This example illustrates the extraction performance of the various extractant solutions when treating acidic metal solutions with varying acid content.

Spent acid from the cell house of a zinc production plant was treated by dialysis to remove most of its acid content. The treated solution was used as feed for zinc extraction using various extractant solutions. A 280 mL portion of extractant was contacted with two 140 mL portions of the feed solution for two minutes. The separated aqueous feed was analyzed for Zn, Mg and Mn. The two feed solutions used were:

a) raw dialyzate from dialysis (35 g/L $H_2SO_4$, 50 g/L Zn, 8 g/L Mg and 1.2 g/L Mn)
b) dialyzate adjusted to pH 2.5 (49.6 g/L Zn, 8.0 g/L Mg, 1.2 g/L Mn)

The equilibrium acidity (or pH) was not controlled in these tests. The results with feed solution a) are given in Table II.

TABLE II

| | Loading after 1st contact g/L | | | Loading after 2nd contact g/L | | |
|---|---|---|---|---|---|---|
| Extractant | Zn | Mg | Mn | Zn | Mg | Mn |
| 30% D2EHPA | 2.6 | 0 | 0.05 | 3.2 | 0 | 0.05 |
| 30% EHPA | 1.8 | 0.15 | 0.1 | 2.2 | 0.25 | 0.2 |
| 30% CNX 302 | 4.2 | 0.1 | 0 | 5.2 | 0.15 | 0 |
| 15% D2EHPA, 15% CNX 302 | 5.1 | 0.05 | 0 | 6.5 | 0.05 | 0 |
| 15% EHPA, 15% CNX 302 | 4.1 | 0.1 | 0.05 | 5.6 | 0.1 | 0.1 |

These results show that at 30% total extractant concentration, the mixed extractants EHPA/CNX 302 and D2EHPA/CNX 302 gave superior performance to any one of EHPA, D2EHPA or CNX 302 by itself. The combination of D2EHPA and CNX 302 gave especially surprising superior performance. Moreover, Zn extraction was selective over Mg and Mn.

The results with feed solution b) are given in Table III.

TABLE III

| | Loading after 1st contact g/L | | | Loading after 2nd contact g/L | | |
|---|---|---|---|---|---|---|
| Extractant | Zn | Mg | Mn | Zn | Mg | Mn |
| 30% D2EHPA | 7.1 | 0.15 | 0.05 | 9.8 | 0.2 | 0.1 |
| 30% EHPA | 4.4 | 0.40 | 0.2 | 8.4 | 0.6 | 0.3 |
| 30% CNX 302 | 6.8 | 0.1 | 0.05 | 11.6 | 0.1 | 0.05 |
| 15% D2EHPA, 15% CNX 302 | 8.4 | 0 | 0.05 | 12.1 | 0.1 | 0.05 |
| 15% EHPA, 15% CNX 302 | 7.7 | 0.1 | 0.05 | 12.1 | 0.15 | 0.05 | again the mixed extractants, EHPA/CNX 302 and D2EHPA/CNX 302 gave superior results, with the latter being especially selective.

EXAMPLE 3

This example demonstrates the ease of stripping Zn from the various extractant solutions. Extractant solutions containing Zn from extraction contacts described in Example 2 were contacted with a zinc stripping solution of 225 g/L $H_2SO_4$. Extractant solution (280 mL) was contacted with two fresh 40 mL portions of the stripping solution. The phases were separated and the aqueous phase analyzed for Zn, Mg and Mn. The results are given in Table IV.

TABLE IV

| | Metals in partially loaded extractant g/L | | | Zn Recovery % | | Maximum Zn conc. in strip, g/L |
|---|---|---|---|---|---|---|
| Extractant | Zn | Mg | Mn | 1 contact | 2 contacts | |
| 30% D2EHPA | 9.8 | 0.2 | 0.1 | 100 | 110 | 79 |
| 30% EHPA | 8.4 | 0.6 | 0.3 | 92 | 100 | 54.5 |
| 30% CNX 302 | 11.6 | 0.1 | 0.05 | 63 | 79 | 50.9 |
| 15% D2EHPA, 15% CNX 302 | 12.1 | 0.1 | 0.05 | 89 | 100 | 75 |
| 15% EHPA, 15% CNX 302 | 12.1 | 0.15 | 0.05 | 84 | 100 | 70.8 |

EXAMPLE 4

This example illustrates by means of relative ranking shown in Table V how the extractants compare from the results given in Examples 1-3.

TABLE V

| Extractant | Phase Separation | Zn Extraction | Selectivity | Zn stripping | Overall |
|---|---|---|---|---|---|
| D2EHPA alone | 80 | 49 | 100 | 100 | 329 |
| EHPA alone | 46 | 34 | 50 | 96 | 226 |
| CNX 302 alone | 100 | 80 | 70 | 65 | 315 |
| D2EHPA/CNX 302 | 92 | 100 | 95 | 95 | 382 |
| EHPA/CNX 302 | 33 | 85 | 80 | 87 | 285 |

Thus, for acidic Zn-containing solutions, the findings from tests showed the following:
1) When extractants were used by themselves, Cyanex 302 gave the best zinc extraction with the fastest phase separation.
2) D2EHPA gave the best selectivity and was most easily stripped.
3) Cyanex 302 was the most difficult to strip.

Surprisingly, the mixtures of D2EHPA/Cyanex 302 and EHPA/Cyanex 302 gave better Zn extraction than the single-extractant solutions. The superior performance of D2EHPA/Cyanex 302 was particularly surprising, in that the result of that mixture was superior to the calculated, weighted sum of the individual components, as shown in Table VI.

TABLE VI

| | Performance measure | | | | |
|---|---|---|---|---|---|
| | Phase Sep'n. | Zn Ext'n. | Selectivity | Zn Stripping | Overall |
| Expected* CNX/D2EHPA | 90 | 65 | 85 | 83 | 323 |
| Actual CNX/D2EHPA | 92 | 100 | 95 | 95 | 382 |

*Based on performance of individual components.

D2EHPA/Cyanex 302 gave an unexpectedly superior result. EHPA/Cyanex 302 was also slightly superior to the sum of Cyanex 302 and EHPA, with an actual overall performance measure of 285 compared to the expected 270. Moreover Zn extraction by Cyanex 302/EHPA mixture ranked 85 compared to an expected 57.

EXAMPLE 5

This example compares the Zn extraction performance of solutions containing different proportions of two mixed extractants with a total extractant concentration of 40% in each:
a) 30% D2EHPA, 10% CNX 302
b) 25% D2EHPA, 15% CNX 302

A 280 mL portion of freshly prepared extractant solution was contacted with two fresh 140 mL portions of a 225 g/L $H_2SO_4$ solution as a conditioning step. The conditioned extractant solution was contacted with two fresh 140 mL portions of an acidic zinc feed solution containing 42.6 g/L Zn and 37 g/L $H_2SO_4$. The raffinates were analyzed for Zn and $H_2SO_4$. The partially loaded extractant solutions were then contacted with two 40 mL fresh portions of a 225 g/L $H_2SO_4$ solution in order to strip the zinc.

The results are shown in Table VII.

TABLE VII

| Extraction | Loading after 1st contact g/L Zn | Loading after 2nd contact g/L Zn |
|---|---|---|
| 30% D2EHPA/10% CNX 302 | 4.1 | 6.3 |
| 25% D2EHPA/15% CNX 302 | 5.0 | 9.3 |

| Stripping | % Zn stripped 1 contact | 2 contacts | Max. Zn concn. in strip liquor g/L |
|---|---|---|---|
| 30% D2EHPA/10% CNX 302 | 84 | 100 | 37.1 |
| 25% D2EHPA/15% CNX 302 | 70 | 86 | 45.6 |

Acid concentrations in the raffinate were higher than that of the original feed in both cases due to acid generation caused by zinc extraction by liquid ion exchange. The 25% D2EHPA/15% CNX 302 extractant gave superior results as compared to 30% D2EHPA/10% CNX 302 extractant for zinc extraction. The stripping of the less-loaded 30% D2EHPA/10% CNX 302 was more efficient than that of the 25% EHPA/15% CNX 302 solution. However, the latter gave a higher zinc concentration in the strip liquor.

EXAMPLE 6

This example illustrates efficient and selective zinc extraction with pH control. Using a feed solution containing 52 g/L Zn, 7.1 g/L Mg and 1.1 g/L Mn, a number of extractions were carried out using 25% D2EHPA and 15% CNX 302. In each case, the equilibrium pH was adjusted to 2.5 by the addition of sodium hydroxide or ammonium hydroxide. The use of ammonium hydroxide for pH adjustment could only be carried out after the zinc concentration in the aqueous phase had been reduced to low levels or when the required ammonium hydroxide was small enough not to cause the precipitation of zinc ammonium sulphate. Multiple contacts with portions of extractant and feed solution were carried out to establish equilibrium distribution and maximum loading achievable at pH 2.5. The aqueous phase (raffinate) was analyzed and the composition of the extractant phase (extract) calculated. The equilibrium data are given in Table VIII.

TABLE VIII

| Raffinate, g/L | | | Extract, g/L | | |
|---|---|---|---|---|---|
| Zn | Mg | Mn | Zn | Mg | Mn |
| 0.002 | 5.5 | 0.34 | 0.7 | 0.8 | 0.38 |
| 0.07 | 6.1 | 0.63 | 8.7 | 0.5 | 0.24 |
| 1.0 | 6.6 | 0.95 | 22.6 | 0.25 | 0.07 |
| 2.1 | 6.4 | 0.94 | 25.2 | 0.35 | 0.07 |
| 2.4 | 6.8 | 1.0 | 37.9 | 0.15 | 0.05 |
| 4.3 | 6.6 | 0.92 | 39.8 | 0.25 | 0.09 |

The results show the extractants to be selective for zinc, with a maximum loading of 39.8 g/L Zn achieved in the extract. From an isotherm derived with the above results, it can be shown that for the feed solution containing 52 g/L Zn, two countercurrent stages of contacting would be required to achieve complete zinc extraction.

These tests also show that the addition of large quantities of alkali would be required to control pH when treating feed solutions of high zinc concentrations.

EXAMPLE 7

This example illustrates acid extraction from zinc-containing solutions by amine extractants. The extractions described in Example 6 required pH control, which was achieved by means of alkali addition. An alternative use of liquid-liquid extraction to remove the acid generated during zinc extraction was demonstrated as follows:

An acidic solution containing 20 g/L Zn and 30 g/L $H_2SO_4$ was contacted with 20% (by volume) solutions of amines at a o/a volume phase ratio of 1. In each contact, the phases were allowed to separate, and the aqueous phase was analyzed. In all cases, no significant change in the zinc concentration was noted. The extraction of acid by two of the amines are given in Table IX:

TABLE IX

| Extractant | Loading after 1st contact (g/L $H_2SO_4$) | Loading after 2nd contact (g/L $H_2SO_4$) |
| --- | --- | --- |
| 20% Primene TM JMT | 25 | 31 |
| 20% Alamine TM 336 | 25 | 33 |

Using a feed solution containing 47 g/L Zn and 39 g/L $H_2SO_4$, Alamine 336 was used to determine the effect of extractant concentration. Results are given in Table X.

TABLE X

| Extractant | Loading after 1st contact (g/L $H_2SO_4$) | Loading after 2nd contact (g/L $H_2SO_4$) |
| --- | --- | --- |
| 10% Alamine 336 | 16 | 17 |
| 20% Alamine 336 | 29 | 35 |

No apparent difference in phase disengagement rate was observed for the 10% and 20% extractant solutions. Therefore, the use of a 20% solution is preferred for its higher capacity for acid removal.

EXAMPLE 8

The equilibrium acid distributions derived from a series of ten contacts of 20% amine solutions (five with Alamine 336, five with Primene JMT) and various acidic solutions are given in Table XI.

TABLE XI

| Raffinate Phase (g/L $H_2SO_4$) | | Extract Phase (g/L $H_2SO_4$) | |
| --- | --- | --- | --- |
| 20% Alamine 336 | 20% Primene JMT | Alamine 336 | Primene JMT |
| 1.3 | 1.3 | 7.0 | 5.5 |
| 2.5 | 2.5 | 14 | 12 |
| 5.0 | 5.0 | 25 | 23 |
| 10.0 | 10.0 | 28 | 26.5 |
| 20.0 | 20.0 | 31.5 | 28.5 |

These equilibrium data can be used to show that a feed solution containing 30 g/L $H_2SO_4$ can be treated with 20% Alamine 336 solution in a counter-current contacting at a phase ratio of 1 to reduce the acid concentration to 2.5 g/L in two stages, or to 0.5 g/L in three stages.

EXAMPLE 9

This example illustrates how the extracted acid may be stripped from the amine solution with water or an alkaline solution in order to allow repeated use of the extractant.

Eight acid loaded amine solutions (four with Alamine 336 and four with Primene JMT) were contacted with water. The phases were separated, and the aqueous phases were analyzed. The acid concentration in each extractant phase was calculated. The results are given in Table XII.

TABLE XII

| g/L $H_2SO_4$ in extractant phase | | g/L $H_2SO_4$ in strip liquor | |
| --- | --- | --- | --- |
| Alamine 336 | Primene JMT | Alamine 336 | Primene JMT |
| 21.3 | 22.0 | 1.75 | 1.0 |
| 22.5 | 23.5 | 3.0 | 3.0 |
| 25.0 | 25.0 | 5.5 | 5.8 |
| 27.5 | 26.3 | 7.5 | 8.5 |

These results show that water stripping can only remove a fraction of the acid from the extractant phase.

Stripping with ammonium hydroxide solution was carried out by contacting a partially loaded (30 g/L $H_2SO_4$) solution of 20% Alamine 336 with a solution which contained 0.6 normal $NH_4OH$ and 3.5 molar $(NH_4)_2SO_4$. The presence of ammonium sulphate enhanced the phase disengagement. The aqueous phase was analyzed to determine the resulting acid removal from the extractant. It was found in a number of tests that, as long as there was sufficient alkali in the strip solution, acid removal from the amine solutions was complete in a single contact.

EXAMPLE 10

This example illustrates a continuous operation of the process using mixer-settlers according to the flow scheme shown in FIG. 3.

Twelve stages of mixer-settlers were assembled to consist of three zinc extraction stages (ZE 1,2,3) one optional additional zinc extraction stage (ZE 4), three acid extraction stages (AE 1,2,3), three zinc stripping stages (ZS 1,2,3), one acid stripping stage (AS 1) and one stage to scrub the acid extractant (ASc 1).

The zinc extractant (organic I) was 25% D2EHPA, 15% Cyanex 302, and the acid extractant (organic II) was 20% Alamine 336.

An aqueous feed solution containing zinc was fed to a first acid extraction stage (AE 1), where it was contacted with the acid extractant at an o/a volumetric phase ratio of 1:4. The raffinate was circulated through a side-by-side first zinc extraction stage (ZE 1). The zinc extractant flow was selected to be three times the fresh aqueous feed rate. Raffinate from ZE 1, was also circulated to AE 1, with a portion fed to the second acid extraction stage AE 2, and so on, as shown in FIG. 3. Aqueous and organic phases were fed counter-currently in the zinc extraction stages but the acid extractant was fed in a parallel manner (cross-flow) to the acid extraction stages. The fourth zinc extraction ZE 4 was used to achieve nearly complete zinc extraction, but this stage did not require a side-by-side acid extraction, as the Zn concentration in the aqueous feed to it was very low.

The zinc extractant leaving extraction was fed through the zinc stripping stages (ZS 1,2,3) countercurrently to a strip solution, which was in one run, a 240 g/L $H_2SO_4$ or, in another run, spent acid solution from a zinc production plant containing about 150 g/L $H_2SO_4$ and 50 g/L Zn. The strip solution was fed at a rate selected to give the desired zinc concentration in the resulting strip liquor. Aqueous recycle was carried out to achieve a volumetric phase ratio of about 1.

The acid extractants from the three acid extraction stages (AE1,2,3) were combined and fed to the acid stripping stage (AS 1), which was also fed with a second strip solution (14 molar NH$_4$OH) and a circulating solution from the scrubbing stage (ASc 1). Moreover, a portion of the aqueous phase from the stripping stage AS 1 was recirculated to give a phase ratio of about 1 in the mixer. The pH of the aqueous phase was maintained at about 8. The acid extractant was finally scrubbed in ASc 1 before returning to the extraction stages. The scrubbing solution consisted of water and some circulating solution from AS 1. The amounts of water and ammonium hydroxide fed were chosen such that the acid was completely neutralized as well as to yield the desired ammonium sulphate concentration in the resulting strip liquor. A typical test result of a continuous run is tabulated in Table XIII.

TABLE XIII

| Aqueous Stream | pH or H$_2$SO$_4$ in g/L | Composition g/L | | | | |
|---|---|---|---|---|---|---|
| | | Zn | Mg | Mn | Cl | (NH$_4$)$_2$SO$_4$ |
| Aqueous feed | 33 | 49 | 6.6 | 1.0 | 0.11 | — |
| Raffinate from ZE 3 | pH 2.1 | 0.069 | 6.9 | 1.5 | — | — |
| Raffinate from ZE 4 | pH 1.7 | 0.045 | 6.5 | 0.96 | 0.08 | — |
| Fresh Zn stripping solution | 156 | 50 | — | — | — | — |
| Zn strip liquor | 11 | 147 | — | — | — | — |
| Acid strip liquor | pH 8 | 0.035 | 0.05 | 0.001 | 0.015 | 460 |

In this run, the optional zinc extraction stage ZE 4 was not necessary to achieve better than 99% zinc recovery.

It is understood that changes and modifications may be made in the methods according to the invention without departing from the scope and purview of the amended claims.

I claim:

1. A method for the selective extraction of zinc from an acidic aqueous solution containing zinc sulfate and essentially free of ferric iron and co-extractable metals including the steps of contacting said solution with an extractant mixture containing an extractant for zinc chosen from the group consisting of mono-2-ethylhexylphosphoric acid, di-2-ethylhexylphosphoric acid, a mixture of mono-2-ethylhexylphosphoric acid and di-2-ethylhexylphosphoric acid, and an extractant for zinc chosen from the group consisting of bis- 2, 4, 4-trimethylpentylmonothiophosphinic acid and bis-2,4,4-trimethylpentyldithiophosphinic acid for the formation of a zinc extract containing said zinc and of a zinc extraction raffinate said extractant mixture having a volume ratio of said phosphoric acid or mixture of phosphoric acids to said thiophosphinic acid in the range of about 1:1 to 6:1; controlling the acid content during said extraction of zinc such that the pH in said extraction is in the range of about 1.3 to 5; separating said extract from said raffinate; contacting separated extract in a zinc stripping with a suitable aqueous stripping solution for removing said zinc from said extract into said stripping solution; and recovering said zinc as a zinc salt solution.

2. A method as claimed in claim 1, wherein said acidic aqueous solution contains zinc sulfate in an amount in the range of about 1 to 300 g/L and sulfuric acid in amount up to about 150 g/L.

3. A method as claimed in claim 1, wherein said acidic aqueous solution additionally comprises at least one metal chosen from the group consisting of calcium, magnesium, sodium, potassium, arsenic, antimony, ferrous iron and manganese.

4. A method as claimed in claim 1, wherein said extractant mixture comprises mono-2-ethylhexylphosphoric acid, di-2-ethylhexylphosphoric acid and bis-2,4,4,-trimethylpentylmonothiophosphinic acid and a diluent.

5. A method as claimed in claim 4, wherein said phosphoric acids and said phosphinic acid are dissolved in a water-immiscible organic diluent in a volume ratio in the range of about 1:1 to 1:9 of acids to diluent.

6. A method as claimed in claim 4, wherein said extractant mixture contains in the range of about 5 to 30% by volume of said phosphoric acids, about 5 to 20% by volume of said phosphinic acid, the balance substantially being diluent.

7. A method as claimed in claim 1, wherein said extractant mixture comprises di-2-ethylhexylphosphoric acid and bis-2,4,4-trimethylpentylmonothiophosphinic acid and a diluent.

8. A method as claimed in claim 7, wherein said phosphoric acid and said phosphinic acid are dissolved in a water-immiscible organic diluent in a volume ratio in the range of about 1:1 to 1:9 of acids to diluent.

9. A method as claimed in claim 7, wherein said extractant mixture contains in the range of about 5 to 30% by volume of said phosphoric acid, about 5 to 20% by volume of said phosphinic acid, the balance substantially being diluent.

10. A method as claimed in claim 3, wherein said pH is controlled in the range of about 1.7 to 3.

11. A method as claimed in claim 1, wherein said stripping solution for removing zinc from said zinc extract is a solution containing sulfuric acid.

12. A method as claimed in claim 1, wherein the acid content during extraction is controlled by neutralization of at least a portion of said acid content by the addition of an alkaline solution selected from the group consisting of sodium hydroxide solution, potassium hydroxide solution and ammonium hydroxide solution.

13. A method as claimed in claim 1, wherein a portion of zinc in the range of not exceeding about 3 to 5 g/L is extracted in each zinc extraction step.

14. A method as claimed in claim 1, wherein the acid content during said extraction of zinc is controlled by the extraction of acid with an organic extractant for said acid in a dual-circuit, side-by-side simultaneous solvent extraction including said extraction of zinc and said extraction of acid, said dual-circuit extraction comprising the steps of contacting said acidic aqueous solution containing zinc sulfate in an acid extraction with an amine-type extractant suitable for extracting acid for the formation of an acid extract and an acid extraction raffinate; passing said acid extract to an acid stripping; stripping said acid from said acid extract with a compound chosen from the group consisting of water and an alkaline substances for the formation of sulfuric acid or a sulfate, respectively; recovering said formed sulfuric acid or sulfate; passing said acid extraction raffinate to a zinc extraction; mixing said acid extraction raffinate in said zinc extraction with said extractant mixture for zinc for the formation of said zinc extract and said zinc extraction raffinate; passing said zinc extract to said zinc stripping for stripping said zinc from said zinc extract with the formation of said zinc salt solution; and passing said zinc extraction raffinate to said acid extraction.

15. A method as claimed in claim 14, wherein each of said acid extraction, said acid stripping, said zinc extraction and said zinc stripping is carried out in one or more stages.

16. A method as claimed in claim 15, wherein said amine-type extractant is chosen from the group of primary, secondary and tertiary amines.

17. A method as claimed in claim 15, wherein said extractant for acid comprises an amine extractant for sulfuric acid chosen from the group consisting of tricaprylamine and a tert alkyl primary amine containing carbon atoms in the range of 16 to 22, and said extractant mixture for zinc comprises mono-2-ethylhexylphosphoric acid, di-2-ethylhexylphosphoric acid and bis-2,4,4,-trimethylpentylmonothiophosphinic acid.

18. A method as claimed in claim 15, wherein said extractant for acid comprises an amine extractant for sulfuric acid chosen from the group consisting of tricaprylamine and a tert alkyl primary amine containing carbon atoms in the range of 16 to 22, and said extractant mixture for zinc comprises di-2-ethylhexylphosphoric acid and bis-2,4,4,-trimethylpentylmonothiophosphinic acid.

19. A method as claimed n claim 15, wherein the alkaline substance is ammonium hydroxide.

20. A method for the selective extraction of zinc from an acidic aqueous solution containing zinc sulfate and essentially free of ferric iron and co-extractable metals including the steps of contacting said solution with an extractant mixture containing an extractant for zinc chosen from the group consisting of mono-2-ethylhexylphosphoric acid, di-2-ethylhexylphosphoric acid, a mixture of mono-2-ethylhexylphosphoric acid and di-2-ethylhexylphosphoric acid, and an extractant for zinc chosen from the group consisting of bis- 2,4,4-trimethylpentylmonothiophosphinic acid and bis-2,4,4-trimethylpentyldithiophosphinic acid for the formation of a zinc extract containing said zinc and of a zinc extraction raffinate; controlling the acid content during said extraction of zinc such that the pH in said extraction is in the range of about 1.3 to 5; separating said extract from said raffinate; contacting separated extract in a zinc stripping with a solution containing hydrochloric acid for removing said zinc from said extract into said stripping solution; and recovering said zinc as a zinc salt solution.

21. A method for the selective extraction of zinc from an acidic aqueous solution containing zinc sulfate and essentially free of ferric iron and co-extractable metals including the steps of contacting said solution with an extractant mixture containing an extractant for zinc chosen from the group consisting of mono-2-ethylhexylphosphoric acid, di-2-ethylhexylphosphoric acid, a mixture of mono-2-ethylhexylphosphoric acid and di-2-ethylhexylphosphoric acid, and an extractant for zinc chosen from the group consisting of bis- 2,4,4-trimethylpentylmonothiophosphinic acid and bis-2,4,4-trimethylpentyldithiophosphinic acid for the formation of a zinc extract containing said zinc and of a zinc extraction raffinate; controlling the acid content during said extraction of zinc such that the pH in said extraction is in the range of about 1.3 to 5; carrying out the extraction of zinc with simultaneous neutralization of a portion of the acid in said zinc extraction such that the free acid content of said zinc extraction raffinate does not exceed an amount of free acid in the range of about 5 to 8 g/L, separating said extract from said raffinate; contacting separated extract in a zinc stripping with a suitable aqueous stripping solution for removing said zinc from said extract into said stripping solution; and recovering said zinc as a zinc salt solution.

22. A method for the selective extraction of zinc from an acidic aqueous solution containing zinc sulfate and essentially free of ferric iron and co-extractable metals including the steps of contacting said solution with an extractant mixture containing an extractant for zinc chosen from the group consisting of mono-2-ethylhexylphosphoric acid, di-2-ethylhexylphosphoric acid, a mixture of mono-2-ethylhexylphosphoric acid and di-2-ethylhexylphosphoric acid, and an extractant for zinc chosen from the group consisting of bis- 2,4,4-trimethylpentylmonothiophosphinic acid an bis-2,4,4-trimethylpentyldithiophosphinic acid for the formation of a zinc extract containing said zinc and of a zinc extraction raffinate; controlling the acid content during said extraction of zinc such that the pH in said extraction is in the range of about 1.3 to 5 by the extraction of at least a portion of said acid in said acid extraction with an amine-type extractant for sulfuric acid chosen from the group consisting of primary, secondary, tertiary and quaternary amines with the formation of an acid extract and an acid extraction raffinate, separating said extract from said raffinate; contacting separated extract in a zinc stripping with a suitable aqueous stripping solution for removing said zinc from said extract into said stripping solution; and recovering said zinc as a zinc salt solution.

23. A method as claimed in claim 22, wherein said acid extractant is selected from tricaprylamine and a tert alkyl primary amine containing carbon atoms in the range of 16 to 22.

24. A method as claimed in claim 22, wherein said acid extractant is mixed with a diluent to give an amine concentration in the range of about 4 to 25% by volume.

25. A method as claimed in claim 22, wherein the extraction of zinc and the extraction of acid are carried out in a series of alternating zinc extraction and acid extraction steps.

26. A method as claimed in claim 22, wherein said acid is stripped from said acid extract with a stripping solution selected from the group consisting of water and an alkaline solution.

27. A method as claimed in claim 26, wherein said alkaline solution is ammonium hydroxide.

* * * * *